United States Patent
Raundahl Gregersen

(10) Patent No.: US 9,411,617 B2
(45) Date of Patent: Aug. 9, 2016

(54) SYSTEM AND METHOD FOR MATCHING SYNTHETICALLY GENERATED INNER CLASSES AND METHODS

(71) Applicant: ZeroTurnaround AS, Tartu (EE)

(72) Inventor: Allan Raundahl Gregersen, Odense SO (DK)

(73) Assignee: ZeroTurnaround AS, Tartu (EE)

( * ) Notice: Subject to any disclaimer, the term of this patent is extended or adjusted under 35 U.S.C. 154(b) by 0 days.

(21) Appl. No.: 14/505,361

(22) Filed: Oct. 2, 2014

(65) Prior Publication Data

US 2015/0100951 A1 Apr. 9, 2015

Related U.S. Application Data

(60) Provisional application No. 61/886,362, filed on Oct. 3, 2013.

(51) Int. Cl.
*G06F 9/44* (2006.01)
*G06F 9/445* (2006.01)

(52) U.S. Cl.
CPC .............. *G06F 9/44521* (2013.01); *G06F 8/67* (2013.01)

(58) Field of Classification Search
CPC ........ G06F 9/44521; G06F 9/445; G06F 8/67
USPC ................................................. 717/166, 168
See application file for complete search history.

(56) References Cited

U.S. PATENT DOCUMENTS

| | | | | |
|---|---|---|---|---|
| 5,974,428 A | * | 10/1999 | Gerard et al. | 717/170 |
| 6,272,674 B1 | * | 8/2001 | Holiday, Jr. | 717/174 |
| 7,882,501 B1 | * | 2/2011 | Carlson et al. | 717/167 |
| 8,516,448 B2 | * | 8/2013 | Morgia et al. | 717/127 |
| 8,667,456 B1 | * | 3/2014 | Czymontek | 717/100 |
| 2004/0015936 A1 | * | 1/2004 | Susarla et al. | 717/166 |
| 2005/0188356 A1 | * | 8/2005 | Lwo | 717/120 |
| 2008/0282266 A1 | | 11/2008 | Kabanov | |

(Continued)

FOREIGN PATENT DOCUMENTS

| WO | 2011/072970 A1 | 6/2011 |
|---|---|---|
| WO | 2012/065845 A1 | 5/2012 |

OTHER PUBLICATIONS

Gregersen, Allan Raundahl, et al. "Towards a Dynamic-Update-Enabled JVM." RAM-SE '09. Genova, Italy: Jul. 7, 2009.

(Continued)

*Primary Examiner* — Anna Deng
(74) *Attorney, Agent, or Firm* — HoustonHogle, LLP

(57) ABSTRACT

A system and method for transforming name synthesized classes in response to dynamic class updates to existing classes, featuring the ability to provide replacement synthetic names for reloaded name synthesized classes. According to a preferred embodiment, the name synthesized classes are anonymous classes. The method stores and tracks the synthetic names for each name synthesized class as they are loaded or reloaded, intercepting the loading of the classes before being defined in a virtual machine. Then, the method maps the synthetic name of the name synthesized classes for each dynamic class update to replacement synthetic names of previously loaded name synthesized classes. In addition, the concepts of the invention are applicable to other types of name synthesized classes, such as local classes, bridge methods and lambda expressions.

24 Claims, 15 Drawing Sheets

(56) References Cited

U.S. PATENT DOCUMENTS

2010/0199259 A1* 8/2010 Quinn et al. .................. 717/106
2014/0019948 A1* 1/2014 Goetz et al. .................. 717/143

OTHER PUBLICATIONS

International Search Report and Written Opinion of the International Searching Authority, mailed on Jan. 26, 2015, from counterpart International Application No. PCT/IB2014/002046, filed on Oct. 3, 2014.

Dmitriev, Mikhail. "Safe Class and Data Evolution in Large and Long-Lived Java Applications." University of Glasgow, Mar. 2001.

Gregersen, Allan Raundahl. "Extending NetBeans™ with Dynamic Update of Active Modules." University of Southern Denmark, 2010.

Pukall, Mario. "JavAdaptor: Unrestricted Dynamic Updates of Java Applications." Otto-von-Guericke-Universität, 2012.

Würthinger, Thomas, et al. "Dynamic Code Evolution for Java." Proceedings of the 8th International Conference on the Principles and Practice of Programming in Java, PPPJ 2010, Vienna, Austria, Sep. 15-17, 2010.

International Preliminary Report on Patentability, mailed on Apr. 14, 2016, from related International Application No. PCT/IB2014/002046, filed on Oct. 3, 2014. Ten pages.

* cited by examiner

180

```
public class Bike {
  Interface MyRide { public void race( ); }

MyRide a = new MyRide() {                    ⎫
       public void race () {                     ⎬—150
          System.out.println("race 1");          ⎭
       }
    };

MyRide b = new MyRide() {
       public void race () {
          System.out.println("race 2");
       }
    };

} //end Bike
```

182

```
public class Bike {
  Interface MyRide { public void race( ); }

MyRide b = new MyRide() {                    ⎫
       public void race () {                     ⎬—152
          System.out.println("race 2");          ⎭
       }
    };

MyRide a = new MyRide() {
       public void race () {
          System.out.println("race 1");
       }
    };

} //end Bike
```

FIG. 2A

// class after reloading
// Example #4: a run-time class redefinition
// changes the content of one of the anonymous
// classes of the original class files 182-4 public class Enclosing { public void doRun() {

```
new B() {
  public void perform() {
    System.out.println("start B");
  }
}.go();
```
152-3 — Associated with compiled class file → Enclosing$1.class  170-1

```
this.addListener(new Interact() {
  public void run() {
    System.out.println("run 1");
  }
});
```
152-1 — Associated with compiled class file → Enclosing$2.class  170-2

```
this.addListener(new Interact() {
  public void run() {
    System.out.println("changed");
  }
});
```
152-5 — Associated with compiled class file → Enclosing$3.class  170-3

162

} // end void doRun()

private void addListener(Interact i) {
    // code omitted
  }

```
interface Interact {
  void run();
}
```
160 — Associated with compiled class file → Interact.class  164

} // end class Enclosing

FIG. 8D

SYSTEM AND METHOD FOR MATCHING SYNTHETICALLY GENERATED INNER CLASSES AND METHODS

RELATED APPLICATIONS

This application claims the benefit under 35 USC 119(e) of U.S. Provisional Application No. 61/886,362, filed on Oct. 3, 2013, which is incorporated herein by reference in its entirety.

BACKGROUND OF THE INVENTION

A platform is a combination of hardware architecture and/or software that enables software to run on user devices, such as desktop computers, mobile phones, and tablets. Software platforms are typically a combination of software libraries and other executables that present well-defined Application Programming Interfaces ("API"). Software developers are increasingly utilizing modern software platforms to enable the creation of platform-independent applications. Modern software platforms typically include a programming language, the compiled output of which executes within the context of machine-dependent programs, known as virtual machines ("VM").

Java is a registered trademark of Oracle Corporation. Oracle associates the Java trademark with its eponymous computer programming language, Java Virtual Machine ("JVM,") and related infrastructure and tools. .NET is a registered trademark of Microsoft Corporation. For its .NET framework, Microsoft provides its C# programming language, .NET Common Language Runtime, and related infrastructure and tools. The .NET Common Language Runtime is the Virtual Machine component of Microsoft's NET framework.

A VM is a software program or library that permits an isolated processing environment to exist on a computer system. VMs hide or abstract the details of the underlying computer system from the software that executes within each VM. To create platform-independent applications, software developers use platform tools to compile the programming language source code into the software executable that runs on the VMs, also known as bytecode. Bytecode is typically a set of binary files that include platform-neutral instructions for implementing application behavior. The VMs interpret the bytecode, and execute corresponding native instructions on the target computer system associated with the bytecode. Examples of software platforms that enable the creation of computer system-independent applications include the Java and .NET platforms.

The Java programming language and runtime package support the tenets of object-oriented programming, which includes the principles of inheritance, polymorphism, and data hiding. Java organizes programming objects into conceptual classes, and saves the compiled bytecode for its classes into data files, also known as class files. Typically, the Java compiler generates one class file for each class defined in a source file, and the name of the class file corresponds to the defined class name within the source file.

In the case of the Java programming language, the Java compiler converts the source code for each Java class definition into its associated bytecode. For example, the Java compiler accepts a source file named "MyClass.java" with source code that includes the class definition for named class "MyClass," converts the source code to bytecode, and stores the bytecode in class file "MyClass.class".

However, instead of defining all classes in separate files, software developers can also define one or more classes within another class. The outer class that includes the definitions of other classes is referred to as the enclosing class, and the classes defined within the enclosing class are referred to as nested, or inner classes.

Developers typically define inner classes to limit the scope of their behaviors to be within the same enclosing class and to ensure high cohesion between classes which share a well-defined responsibility. In Java, there are 4 types of inner classes: static member classes, member classes, local classes and anonymous classes.

When a member of a class is declared as 'static' in Java, by prefacing the member with the 'static' keyword, only one copy of the data is maintained for all objects of that class. Of the 4 types of inner classes, member classes and static member classes refer to classes that are declared within the body of an enclosing class, and are therefore named members of the enclosing class. Static member classes and member classes exhibit similar naming conventions and are therefore referred to as member classes henceforth.

Local classes and anonymous classes are classes that are defined within a method of an enclosing class, and therefore have scope that is local only to the method in which they are defined. Local classes have a defined name, and anonymous classes have no name. As a result, local and anonymous classes are often referred to as named non-member classes and unnamed non-member classes, respectively. Multiple, same-named local classes can be declared within the same outer class as long as the scope of the local classes differs.

In contrast to member classes, local classes and anonymous classes share a common naming scheme that includes synthetically-generated parts such as variables in their class names. The java compiler includes the synthetically-generated parts in the class names so that their class names are unique. This allows the proper bytecode for each local and anonymous class to be linked and executed at run time.

In general, classes having synthetically generated names are defined as any class name identified at run time that differs from its originally defined class name in source code, if such source code exists. With respect to Java, synthetically generated names are associated with class names for local classes, anonymous classes, generated classes, and lambda classes, in examples. Lambda classes are also known as lambda expressions. An example of a generated class is a bridge method. As a convenient shorthand, classes having synthetically generated names are also referred to as name synthesized classes.

Of the inner classes, only member classes are "fully named," meaning that their original class names are not modified. Although member classes are defined within an enclosing class, the compiler generates a separate class file for each member class that includes the bytecode for each member class. The name for each member class file is the name of the member class appended to the enclosing class name. Using Java as an example, source file "Outer.java" provides a definition for class "Outer." The class definition for class Outer then includes a class definition for a member class named "Inside." The Java compiler generates class files "Outer.class" and "Outer$Inside.class," which include the bytecode associated with the definitions of classes Outer and Inside, respectively.

Anonymous classes, in contrast, enable developers to declare and instantiate a class at the same time. Though they are classes, they do not have a class name in their source files. Anonymous classes allow developers to declare an inner class within the source code of an enclosing class without naming the class. Anonymous classes are typically utilized when developers need to construct only one locally-scoped instance of a class in an application.

Unlike local and member classes, an anonymous class definition is an expression. The expression associated with an anonymous class includes the "new" operator, and is therefore similar to a constructor call. Because an anonymous class definition is an expression, it is terminated with a semicolon. An anonymous class is a subclass of a named class or declared interface, where the anonymous class overrides some or the entire set of behaviors of the named superclass or interface.

As with member classes, the compiler generates individual class files that include the bytecode for each anonymous class. However, because anonymous classes have no name, the compiler synthetically generates a class file name for each anonymous class. Specifically, when naming each anonymous class, the Java compiler typically creates a name that includes the declared name of the enclosing class as a prefix, followed by a '$' character, and followed by a generated numerical value suffix.

During compilation, the compiler performs "top-down" traversal of the source code for each enclosing class. For each anonymous class that the compiler encounters during compilation, the compiler monotonically increases the generated numerical value. A compiler performing compilation upon an enclosing class named "Enclosing," for example, would typically generate class file name "Enclosing$1.class" for the first anonymous class encountered within class Enclosing, "Enclosing$2.class" for the second anonymous class encountered, etc. This provides each anonymous class with a uniquely named class file.

Though local classes are named classes like member classes, local classes can include synthetic parts in the compiled class file name. For example, when two same-named local classes are declared within the same enclosing class, but with different scope (e.g. within two different methods), the Java compiler typically creates a name that includes the declared name of the enclosing class as a prefix, followed by a '$' character, followed by a generated numerical value and followed by the specifically declared local class name.

Software developers change the behavior of an application by making changes to the classes that define the behavior of the application. Java provides a limited ability to change the behavior of running applications without having to stop and restart the applications. This is accomplished via run-time class reloading. Run-time class reloading provides the ability to update the definitions of currently loaded classes of an application running on a computer system with redefined versions of the classes, in response to a dynamic class update to the existing classes.

The currently loaded classes are associated with versions of the classes that were loaded by a class loader of a JVM during creation of the application. For this reason, the class files that are currently loaded in a running instance of an application are also known as existing classes. Because the dynamic class update loads redefined versions of the existing classes at run-time, the redefined versions of the classes are also known as reloaded classes.

Java supports run-time class reloading via its HotSwap feature. Current HotSwap implementations are built into stock versions of major JVMs. Using HotSwap, a developer can create a new definition for a class currently loaded in a running instance of an application, and apply this new definition of the class without having to stop and restart the application instance to incorporate the new class definition. The new class definition is also known as a class redefinition.

However, HotSwap's run-time class redefinition capability is limited. It does not support many different ways that classes can be redefined. Specifically, HotSwap only supports redefinitions of method bodies of existing classes. In examples, HotSwap does not support changes to constructors of existing classes and changes to the superclass hierarchy of existing classes. In addition, HotSwap often experiences run-time execution errors when existing classes include inner classes such as anonymous classes, and the reloaded classes include changes that modify the contents or execution order of the anonymous classes.

The HotSpot VM has provided a limited ability to redefine classes at runtime since JDK 1.4. This functionality is largely based on the work of Mikhail Dmitriev, from "Safe Class and Data Evolution in Large and Long-Lived Java Applications," PhD thesis, University of Glasgow, 2001. More recent run-time class redefinition proposals include "Dynamic code evolution for Java," Thomas Würthinger, Proceedings of the 8th International Conference on the Principles and Practice of Programming in Java, PPPJ 2010, Vienna, Austria, Sep. 15-17, 2010. The Dynamic Code Evolution VM (DCEVM) allows arbitrary changes to class definitions. In addition, a publication by Allan Raundahl Gregersen, "Extending Net-Beans with Dynamic Update of Active Modules," PhD thesis, University of Southern Denmark, 2010, discusses dynamic update of code modules using the NetBeans development platform. NetBeans is a registered trademark of Oracle, Inc.

Currently, the most widespread run-time class reloading system in use is JRebel, an application-level system that enables runtime reloading of classes by utilizing bytecode re-writing at class load time. JRebel is a registered trademark of ZeroTurnaround USA, Inc.

For run-time reloading of member classes, though the contents of an originally-loaded class and a redefined class may change, a Java class loader always loads the correct class file from the list of class files in an application. This is because for member classes, the class file name created by the compiler is eponymous with its declared class name in the Java source code.

Fingerprint algorithms are primarily used to generate unique, fixed-length output data that acts as a shortened reference to the original data. This is useful when the original data is too cumbersome to use in its original format. The fixed-length output data, also referred to as a fingerprint, is a unique identifier that provides for such capabilities as searching and matching of the original data that would have been difficult or impossible using the format of the original data. A typical example of a fingerprint algorithm is a hash function.

SUMMARY OF THE INVENTION

Current state-of-the-art dynamic class reloading mechanisms like JRebel and DCEVM provide the ability to change the code within an existing class, and to add new classes. However, even these systems do not adequately handle changes to anonymous classes and other name synthesized classes, even in simple scenarios. One such scenario is when two different, but type-compatible, anonymous classes swap positions in the class file between the originally loaded class file, and in the redefined class file after run-time reloading. If the code before the class reload operation had included a reference to an object of the first anonymous class, the JVM would instead execute the code declared in the second anonymous class after performing the class reloading.

Moreover, current state-of-the-art class reloading systems will not properly handle changes to the ordered set of anonymous classes for currently running objects. Examples include when redefined versions of the anonymous classes include changes to one or more of the named super types of the anonymous classes, and when a class redefinition includes a new anonymous class. Such changes will likely cause unexpected behavior and errors for running applications.

The present invention relates to the ability to dynamically redefine classes in a running Java application. More particularly, the present invention enables correct runtime behavior when an existing set of classes in a running application include name synthesized classes such as anonymous classes, and the definitions of the anonymous classes are changed by a class reloading event that includes redefined versions of the anonymous classes in a dynamic update.

During a dynamic update, because the definitions of existing classes are reloaded with new/redefined versions of the existing classes, the new definitions of the existing classes are also known as reloaded classes. In a similar fashion, reloaded versions of name synthesized classes of existing classes are also known as reloaded name synthesized classes.

Examples of problems that can occur when dynamically updating anonymous classes include when the compile-time declaration order of anonymous classes changes after a class reloading, such as when a class redefinition includes a new anonymous class inserted between two existing anonymous class definitions, or when there are changes to the definitions of the anonymous classes themselves.

In addition, the invention provides the ability to reload changes to other name synthesized classes and generated classes, such as same-named local classes, bridge methods, synthetic classes, generated classes and lambda expressions/classes. In the case of Lambda classes, the compiler typically generates synthetic methods for each Lambda expression, where a suffix based on source file position is utilized to provide uniqueness in bytecode.

The ability to reload changes to anonymous classes and other name synthesized classes and generated classes at runtime provides significant advantages over present approaches to dynamic class redefinition. Moreover, an increasing number of non-Java programming languages have begun to produce software that runs on the Java Virtual Machine. Noteworthy examples include JRuby, JPython, Groovy, and Scala. The concepts detailed in this invention can be likewise applied to other such languages that support generation of synthetic runtime artifacts and run-time class reloading.

In general, according to one aspect, the invention features a method for transforming name synthesized classes of existing classes of an application running on a computer system, in response to dynamic class updates to the existing classes. In response to a run-time event that reloads the name synthesized classes of the existing classes with reloaded name synthesized classes, the method compares unique identifiers for each of the reloaded name synthesized classes with entries in a data structure that represents the unique identifiers for previously loaded name synthesized classes, wherein each of the reloaded name synthesized classes has a synthetic name. In response to finding that a unique identifier for a reloaded name synthesized class matches an entry in the data structure, the method replaces occurrences of its synthetic name within the bytecode of the reloaded name synthesized class with a replacement synthetic name.

In one implementation, the entries in the data structure include the synthetic names for the reloaded name synthesized classes, and the replacement synthetic names. Additionally, intercepting loading of the classes during each dynamic class update enables creation of the data structure utilized for transforming the name synthesized classes.

Preferably, the method indexes the data structure entries by the names of enclosing classes for each of the name synthesized classes. Typically, each replacement synthetic name is associated with a version of the name synthesized classes that was loaded during a prior dynamic class update or original class loading to the existing classes.

The method stores metadata associated with each of the name synthesized classes loaded during the dynamic class updates to identify different versions for the name synthesized classes. Preferably, the method stores super class names, field names, method names, constructors, nested inner classes, and names of implemented interfaces, if any, for each of the name synthesized classes loaded during the dynamic class updates.

The method stores unique identifiers associated with each of the name synthesized classes loaded during the dynamic class updates to identify bytecode of the name synthesized classes, and calculates the unique identifiers for each of the name synthesized classes by creating a fingerprint based on the bytecode for each of the name synthesized classes.

In a preferred embodiment, the method determines each replacement synthetic name by comparing the unique identifiers for each of the reloaded name synthesized classes during the run-time reloading event with the unique identifiers for the name synthesized classes previously loaded. Additionally, the method uses the synthetic name of the name synthesized class of a matched unique identifier, from the name synthesized classes previously loaded, as the replacement synthetic name.

In other examples, the method updates values of the unique identifiers for each of the reloaded name synthesized classes during the run-time event that reloads the name synthesized classes, in response to identifying bridge methods generated by a compiler in each enclosing class of the reloaded name synthesized classes. The method preferably ensures that enclosing classes for each of the name synthesized classes are loaded prior to loading the name synthesized classes.

In yet another example, the method provides the ability to transform lambda expressions implemented by a source compiler as the name synthesized classes. Preferably, the method accepts redefined name synthesized classes during the dynamic class updates to the existing classes, and accepts redefined enclosing classes of the name synthesized classes during the dynamic class updates to the existing classes.

The transforming of the reloaded name synthesized classes provided by the method enables the existing classes to invoke originally loaded versions of the name synthesized classes. The method preferably leaves bytecode unchanged for classes other than the name synthesized classes during the dynamic class updates to existing classes.

Preferably, the method executes within a virtual machine, the virtual machine running on the computer system.

In general, according to another aspect, the invention features a method for transforming synthetically generated code of classes in response to dynamic class updates to classes of an application running on a computer system. In response to a run-time event that reloads the classes, the method compares synthetic names for each of the reloaded classes with entries in a data structure. And, in response to finding that the synthetic names for each reloaded class matches an entry in the data structure, the method replaces occurrences of the synthetic name in each reloaded class with a replacement synthetic name.

Preferably, the synthetically generated code is associated with anonymous classes, and additionally is associated with bridge methods and lambda expressions, in other examples. The method replaces the occurrences of the synthetic name in each reloaded class with the replacement synthetic name from the matched data structure entry to transform the classes.

In general, according to yet another aspect, the invention features a system for transforming name synthesized classes of existing classes of an application running on a computer system, in response to dynamic class updates to the existing classes. The system includes a class interceptor that intercepts the loading of dynamically updated class definitions of the existing classes by a class loader. The dynamically updated class definitions of the existing classes include reloaded name synthesized classes.

The class interceptor compares unique identifiers for each of the reloaded name synthesized classes with entries in a data structure that represents the unique identifiers for the existing name synthesized classes, in response to a run-time event that causes the class loader to reload the name synthesized classes. The class interceptor then replaces occurrences of synthetic names in the reloaded name synthesized classes with replacement synthetic names.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2A shows code for exemplary enclosing class "Bike," displaying both original and reloaded versions of the enclosing class utilized in FIG. 2B;

FIGS. 8A-8D provide examples of reloaded class files that change the anonymous classes of FIG. 7, for illustrating how changes to the original set of anonymous classes in dynamic class updates cause improper run-time behavior for current class reloading systems and methods;

DETAILED DESCRIPTION OF THE PREFERRED EMBODIMENTS

Figure 1:
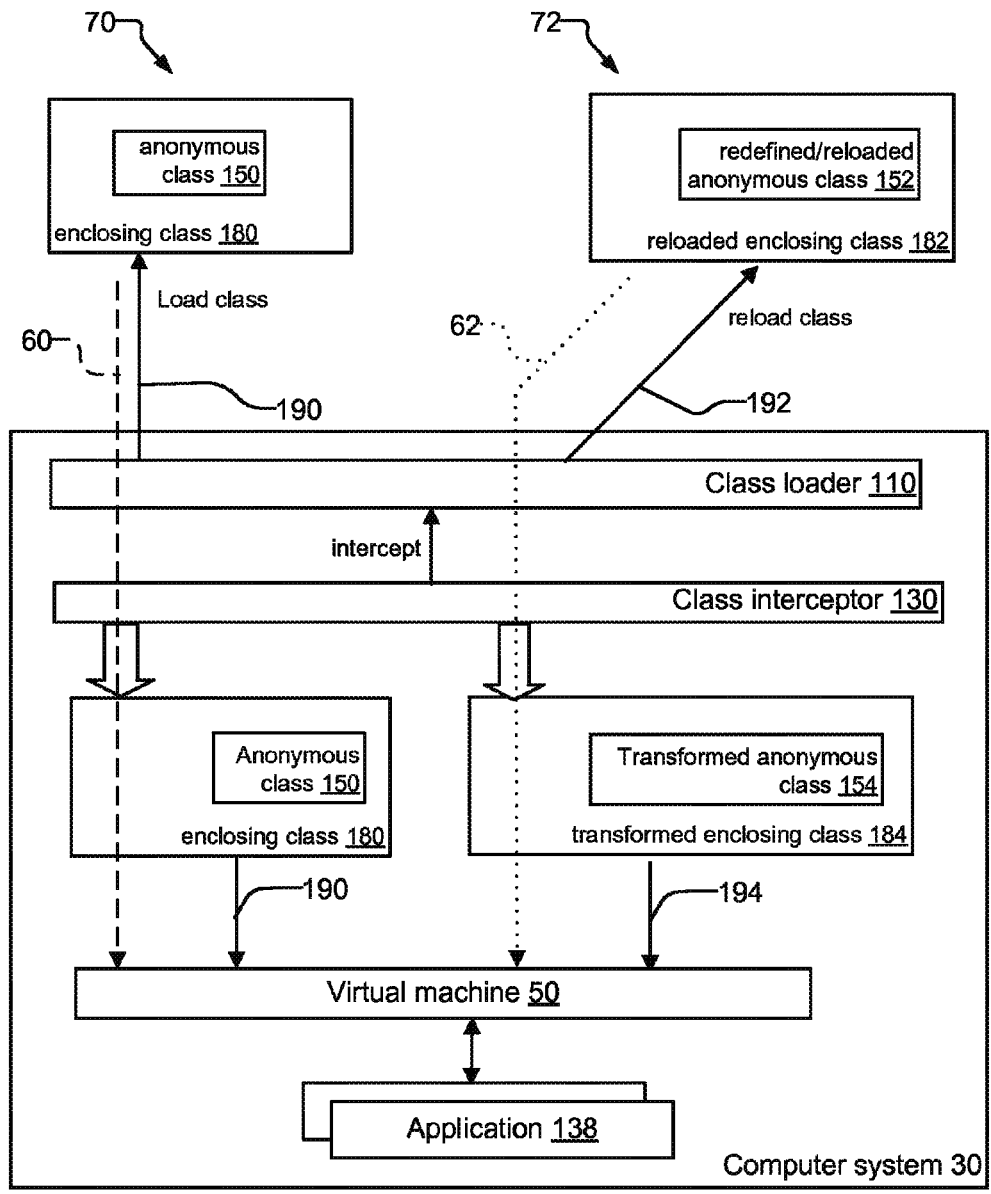
FIG. 1 is a schematic block diagram of a preferred embodiment of the system that illustrates the initial class loading of an exemplary anonymous class for an application, reloading of a redefined version of the anonymous class, and transformation of the reloaded anonymous class according to principles of the invention.

FIG. 1 illustrates a dynamic class update of existing classes for an instance of an application 138. The figure illustrates the class loading 60 of an initial version of an anonymous class 150 during a run-time class loading event 70, and the class reloading 62 of a redefined version of the same anonymous class, or reloaded anonymous class 152, during a run-time class reloading event 72. The dynamic class update occurs in response to the run-time reloading event 72. The original anonymous class 150 is included within an enclosing class 180 and the redefined/reloaded anonymous class 152 is included within a reloaded enclosing class 182.

Each application instance 138 preferably runs within a virtual machine 50 of the computer system 30. Computer systems 30 include such devices as a mobile device, tablet computer, or workstation. In one example, the computer systems 30 includes one or more processors and a memory configured to store instructions executable by the processor.

In a preferred embodiment, the virtual machine 50 is a Java virtual machine ("JVM"). While an increasing number of programming languages other than Java can execute within a JVM, the figures of this section focus on features and concepts of the Java programming language.

In the preferred embodiment, class interceptor 130 intercepts the loading (and reloading) of all class files before a class loader 110 can define the bytecode for the class files into the virtual machine 50. For the class loading 60 of the initial version of anonymous class 150, the class interceptor 130 initially stores metadata for the anonymous class 150 and its enclosing class 180, and then defines the original bytecode 190 for the anonymous class 150 into the virtual machine 50.

For the class reloading 62 of redefined anonymous class 152, the class interceptor 130 also initially stores metadata for the reloaded anonymous class 152, and the reloaded version of its enclosing class, referred to as reloaded enclosing class 182. Then, using the metadata stored for the anonymous class 150 and the reloaded anonymous class 152, the class interceptor 130 transforms the reloaded bytecode 192 for redefined anonymous class 152 into transformed bytecode 194 associated with a transformed anonymous class 154. After transformation, the original enclosing class 180 is now referred to as a transformed enclosing class 184 because it includes references to transformed anonymous classes 154.

The transformation provided by the class interceptor 130 addresses run-time behavioral issues associated with current approaches to dynamic class updates to existing classes, when the dynamic class updates include changes to name synthesized classes such as anonymous classes. Details for the storing of the metadata and the utility of the metadata in transforming the reloaded anonymous classes 152 is provided in the description that accompanies FIG. 2 and later figures hereinafter.

Figure 2B:
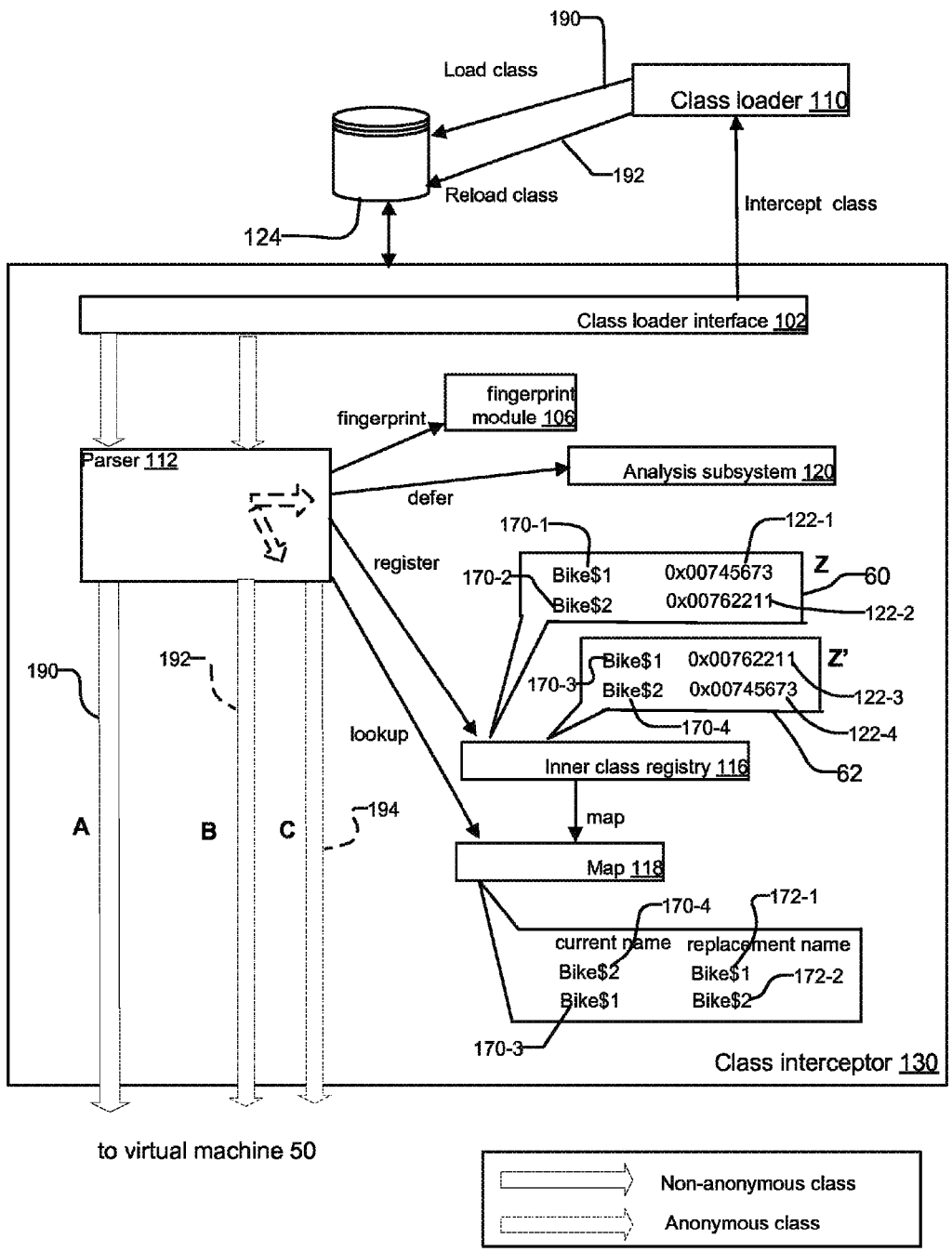
FIG. 2B shows detail for a class interceptor system of the preferred embodiment, with interactions between the major components of the class interceptor system for performing dynamic class updates of existing classes, when the updates include reloaded anonymous classes for the exemplary enclosing class "Bike" of FIG. 2A.

FIG. 2A shows exemplary code for an original enclosing class 180 named "Bike" with original anonymous classes 150, and a reloaded version of the same class, referred to as reloaded enclosing class 182, which includes reloaded anonymous classes 152. The reloaded anonymous classes 152 simply swap the positions of the original anonymous classes 150 from the original enclosing class 180 to provide a simple illustration of problems inherent to run-time class redefinition/reloading of anonymous classes. The code is referenced in FIG. 2B and in other figures hereinafter.

FIG. 2B provides detail for the class interceptor 130 of the preferred embodiment. As in FIG. 1, the class interceptor 130 intercepts the loading and reloading of class files by the class loader 110 during dynamic class updates. A class loader interface 102 of the class interceptor 130 accepts the original bytecode 190 and reloaded bytecode 192 of classes of an application 138. In one implementation, the class files that include the loaded and reloaded classes reside within a file storage system 124, such as a database.

The class loader interface 102 accepts all class files for the application 138 during each class loading or reloading event. During each class loading or reloading event, a parser 112 accepts the class files, and parses their contents. If the parser 112 determines that the current class is an anonymous class 150, the parser first loads the enclosing class 180 that includes the anonymous class 150. If the current class is not an anonymous class 150, the parser 112 allows the current class and its original bytecode 190 to continue its execution flow path, labeled A, to virtual machine 50.

Execution flow paths B and C, in contrast, are associated with loading and/or reloading anonymous classes 150. If the set of anonymous classes 150 remains unchanged during a reloading event as compared to the set of previously loaded anonymous classes 150, the reloaded bytecode 192 for each anonymous class 150 is associated with execution flow path B. When a reloading event changes the set of anonymous classes 150, the transformed bytecode 194 of each transformed anonymous class 154 is associated with execution flow path C.

In other implementations, the execution paths A, B, and C can include additional class interceptors 130 that perform additional operations on a per-class file basis before writing the definitions for the classes into the VM 50.

During each class loading and reloading event, the parser 112 registers each version of the anonymous classes 150 in a map or inner class registry 116. The inner class registry 116 maintains information that includes unique identifiers 122 for each anonymous class 150, and the names of the enclosing classes 180 that include the anonymous classes 150. In one implementation, the inner class registry 116 maintains the most recent information about all anonymous classes 150. In another implementation, the parser 112 creates a separate entry in the inner class registry 116 for each anonymous class 150 encountered by the parser 112 during each class loading and reloading event.

A preferred embodiment operates at the application-level. However, a VM-level implementation can also be utilized to manipulate bytecode of anonymous classes. In particular, a VM-level approach would likely provide the ability to defer calculation of fingerprint information, such as hash values that provide a unique identifier 122 for the anonymous classes 150, until the enclosing class 180 has actually been recompiled and the reload event is attempted.

Each entry in the inner class registry 116 preferably includes metadata such as the synthetic name 170, or synthetic class name for each anonymous class 150, the name of its enclosing class 180, and the unique identifier 122 associated with the contents of each anonymous class 150. In the preferred embodiment, the parser 112 instructs a fingerprint module 106 to create the unique identifier 122 as a fingerprint associated with the bytecode of each anonymous class 150 and reloaded anonymous class 152.

Exemplary enclosing class 180 "Bike" is included within an initial run-time loading event 60. Enclosing class Bike 180 and its anonymous classes 150 are included within file storage system 124. The Java compiler generates synthetic names Bike$1 170-1, and Bike$2 170-2, for the anonymous classes 150. The java compiler creates the synthetic names 170 in the order in which they appear/are defined within enclosing class Bike 180. The parser 112 instructs the fingerprint module 106 to create unique identifiers 122-1 and 122-2 associated with the bytecode of anonymous classes Bike$1 170-1 and Bike$2 170-2. The parser 112 then creates two entries in the inner class registry 116 for the anonymous classes 150, labeled as Z.

Then, a developer makes a change to enclosing class Bike 180, redefining the class by simply swapping the declaration order of its two inner anonymous classes 150, but leaving the code otherwise unchanged. This is the code for FIG. 2A reloaded enclosing class 182 and its reloaded/redefined anonymous classes 152. The class interceptor 130 intercepts all class files included within run-time reloading event 62, which includes reloaded enclosing class Bike 182 and its reloaded anonymous classes 152.

Then, the class interceptor 130 compares the new set of metadata created for the reloaded anonymous classes 152 in the reloading event 62, also labeled as Z', with the metadata associated with the anonymous classes 150 in the inner class registry 116. If changes are detected, the class interceptor 130 updates the existing values in the inner class registry 116 with the values associated with the reloaded anonymous classes 152.

Although the code for the anonymous classes 150 and the code for the reloaded anonymous classes 152 has not changed from the prior class loading event 60, the generation of the synthetic names 170 by the Java compiler for the run-time reloading event 62 will cause run-time behavioral issues for current class reloading systems. This is because the Java compiler generates synthetic names 170-3, Bike$1, and 170-4, Bike$2, for the reloaded anonymous classes 152, according to the "swapped" order in which the reloaded anonymous classes 152 appear in reloaded enclosing class Bike 182.

However, note that the unique identifier 122-3 associated with synthetic name Bike$1 170-3 of the reloading event 62 has the same value as the unique identifier 122-2 associated with synthetic name Bike$2 170-2 of the loading event 60, and that the unique identifier 122-4 associated with synthetic name Bike$2 170-4 of the reloading event 62 has the same value as the unique identifier 122-1 associated with synthetic name Bike$1 170-1 of the loading event 60. By tagging each version of an anonymous class 150 loaded during each dynamic loading event with a unique identifier 122 associated with the bytecode of the anonymous class 150, and storing its corresponding synthetically-generated class name 170, the class interceptor provides 130 version tracking of all versions of anonymous classes 150 loaded for an application 138.

The version tracking of anonymous classes 150 by the class interceptor 130 and its related components provides a clear benefit. It is the ability to relate the synthetic names 170 of anonymous classes 150 loaded during prior dynamic class updates, to the synthetic names 170 of reloaded anonymous classes 152 that are reloaded during subsequent dynamic class updates. In one implementation, the class interceptor 130 stores these relationships in entries within a Map 118. Using this mechanism, the class interceptor 130 can resolve run-time synthetic name 170 conflicts associated with changes to the set of anonymous classes reloaded during subsequent dynamic class updates, which current systems and methods cannot.

The class interceptor 130 instructs the parser 112 to parse all anonymous classes 150 and reloaded anonymous classes 152 associated with the dynamic class updates. The class interceptor 130 then creates the entries in the inner class registry 116, and determines if the unique identifier 122 for each reloaded anonymous class 152 for the current dynamic class update matches the unique identifier 122 of an entry in the inner class registry 116. Upon finding a match, the class interceptor 130 creates an entry in the Map 118 that relates the "current name" for the synthetic name 170 of the currently reloaded anonymous class 152, to the "replacement name" 172 of prior loaded versions of each anonymous class 150.

In the example, the class interceptor 130 creates two entries in Map 118. One entry relates the "current name" Bike$2 170-4 for the first reloaded anonymous class 152 declared in the reloaded enclosing class 182 of the dynamic class update, to the "replacement name" Bike$1 172-1 of the anonymous class 150 for the initial run-time loading event 60. The other entry relates the "current name" Bike$1 170-3 for the second reloaded anonymous class 152 declared in reloaded enclosing class 182 of the dynamic class update, to the "replacement name" Bike$2 172-2 of the anonymous class 150 for the initial run-time loading event 60.

Finally, just prior to defining each of the reloaded anonymous classes 152 of the current dynamic class update into the virtual machine 50, the class interceptor 130 determines if the synthetic name 170 for each reloaded anonymous class 152 matches the current name field for an entry in the Map 118. If this is the case, the class interceptor 130 instructs the parser 112 to parse the bytecode of the class file pointed to by the current name. Then, the class interceptor 130 replaces occurrences of the current name within the class file with the replacement name from the entry in the Map, and uses this to transform the reloaded anonymous classes 152 into transformed anonymous classes 154. The transformed anonymous class 154 and its transformed bytecode 194 continue its execution flow path, labeled C, to the virtual machine 50.

Preferably, the class interceptor 130 stores additional metadata associated with each anonymous class 150 during the creation of the entries of the inner class registry 116. This metadata includes the superclass name for each anonymous class 150, and any defined interfaces of the anonymous classes 150.

The class interceptor 130 then determines if the code for a reloaded anonymous class 152 and its relative position in its reloaded enclosing class 182 for the current dynamic class update has not changed compared to the anonymous class 150 of prior class loading events. If this is the case, the class interceptor 130 allows the reloaded bytecode 192 of the current reloaded anonymous class 152 to continue its execution flow path, labeled B, to virtual machine 50.

In some cases, the class interceptor 130 requires additional context-specific information to determine the replacement synthetic names 172. In these instances, such as determining the correct run-time behavior for dynamic class updates that include bridge methods 192, the class interceptor 130 defers decisions to an analysis subsystem 120. More information for handling of bridge methods 192 follows the discussion associated with FIG. 10, included hereinafter. More details for the analysis subsystem 120 follows the discussion associated with FIG. 9A-9D, included hereinafter.

Figure 3:
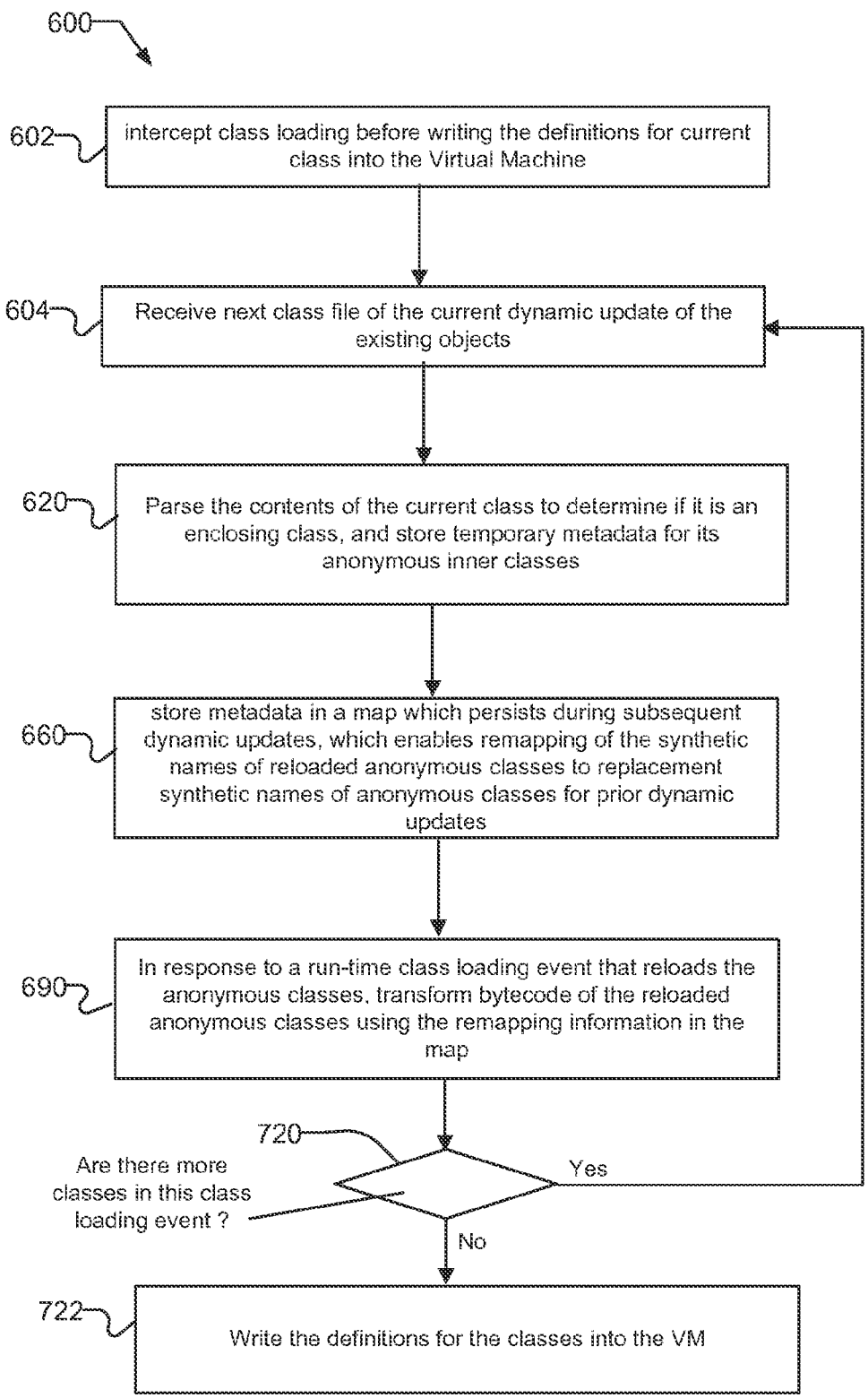
FIG. 3 is a flowchart summarizing a method associated with the preferred embodiment of the invention illustrated in FIG. 2B.

FIG. 3 displays a method 600 for transforming anonymous classes 150 in response to dynamic class loading events. In step 602, the class interceptor 130 intercepts class loading before writing the definitions for the current class into the virtual machine 50. In step 604, the class interceptor 130 receives the next class file in the set of changed classes of the current dynamic update. According to step 620, the class interceptor 130 parses the contents of the current class to determine if it is an enclosing class 180, and stores temporary metadata for the anonymous classes 150 of the enclosing class 180.

The class interceptor 130 stores the metadata in a Map 118 that persists through subsequent dynamic updates. This enables remapping of the synthetic names 170 of the reloaded anonymous classes 152 to replacement synthetic names 172 of previously loaded anonymous classes 150 for prior dynamic updates, in step 660. Then, in step 690, in response to a run-time class loading event that reloads the anonymous classes 150, the class interceptor 130 transforms the bytecode of the reloaded anonymous classes 152 using the information in the Map 118.

In step 720, the class interceptor 130 determines if there are any classes remaining in the current dynamic class loading event, transitioning to step 604 if additional classes remain. If no classes remain, the class interceptor 130 transitions to step 722 to write the definitions for the classes into the virtual machine 50.

Figure 4:
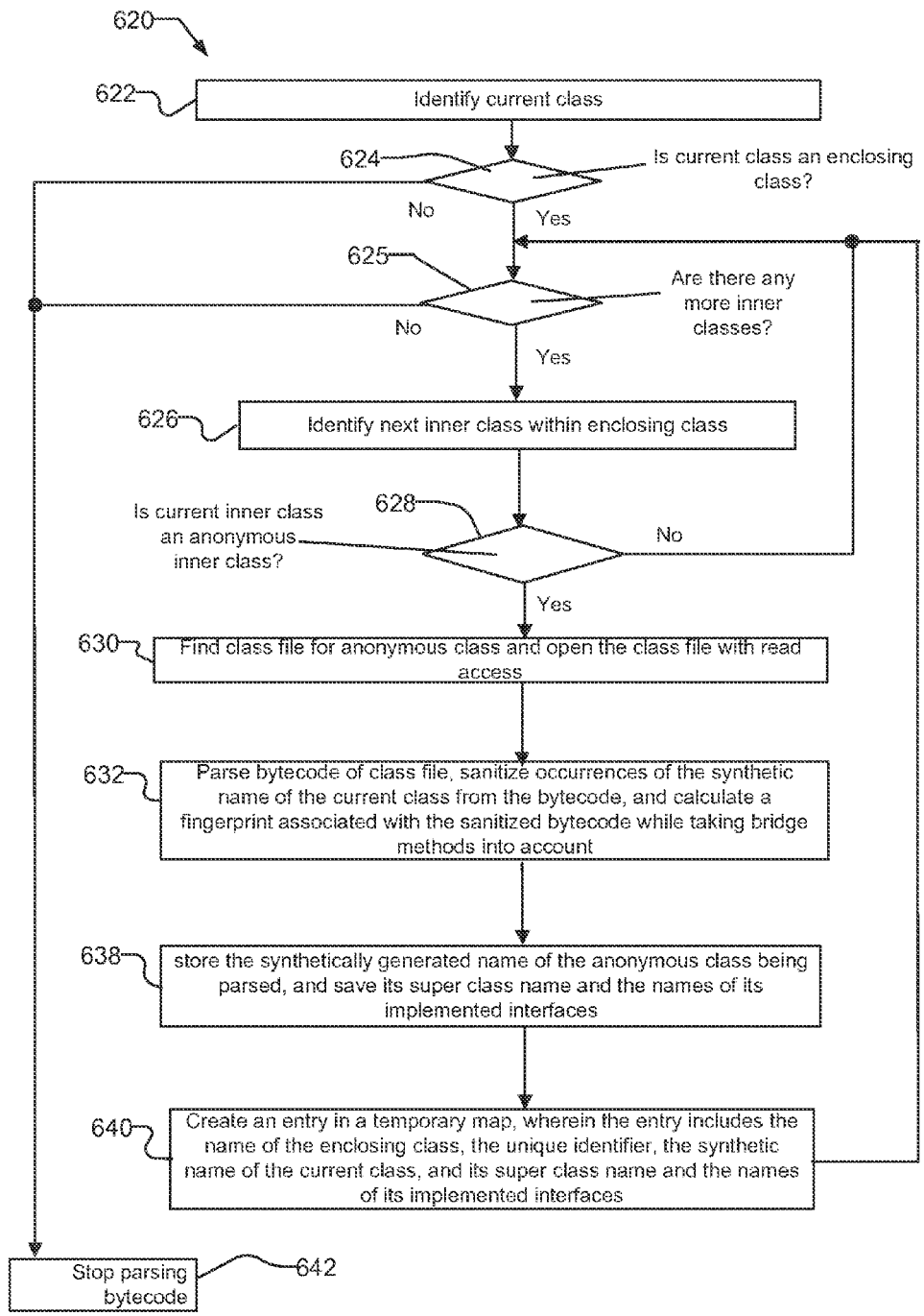
FIGS. 4-6 show flowcharts that provide detail for steps of the flowchart in FIG. 3.

FIG. 4 provides detail for step 620 for the method of FIG. 3. In step 622, the class interceptor 130 identifies the current class. In step 624, the class interceptor 130 determines if the current class is an enclosing class 180. If the current class is not an enclosing class 180, the method transitions to step 642 to stop parsing the code for the current class. Otherwise, the method transitions to step 625 to determine if there are any inner classes included within the enclosing class 180.

If there are no more inner classes in step 625, the method transitions to step 642 to stop parsing the code for the current class. Otherwise, the method transitions to step 626 to identify the next inner class within the enclosing class 180.

Then, according to step 628, the method determines if the current inner class is an anonymous class 150. If the current inner class is not an anonymous class 150, the method transitions back to step 625 to determine the next inner class/if there are any more inner classes. Otherwise, the method transitions to step 630 to find the class file associated with the current anonymous class 150, and opens the associated class file with read access. Then, in step 632, the method parses the bytecode of the class file, sanitizes occurrences of the synthetic name 170 of the current anonymous class 150 from the bytecode, and calculates a fingerprint or unique identifier 122 associated with the sanitized bytecode, while taking bridge methods 202 into account.

Then, in step 638, the method stores the synthetically generated name 170 of the anonymous class 150 being parsed, and saves its super class name and the names of its implemented interfaces. Note that the super class name for an anonymous class 150 and the names of its implemented interfaces are also known as "super types." In step 640, the method creates an entry in a temporary map, wherein the entry includes the name of the enclosing class 180, the synthetic name 170 of the current anonymous class 150, and the additional metadata associated with each anonymous class 150/152 including the names of its super class and its implemented interfaces.

Upon completion of step 640, the method has finished processing of the current anonymous class 150. As a result, the method transitions back to step 625 to find the next inner class to process.

Figure 5:
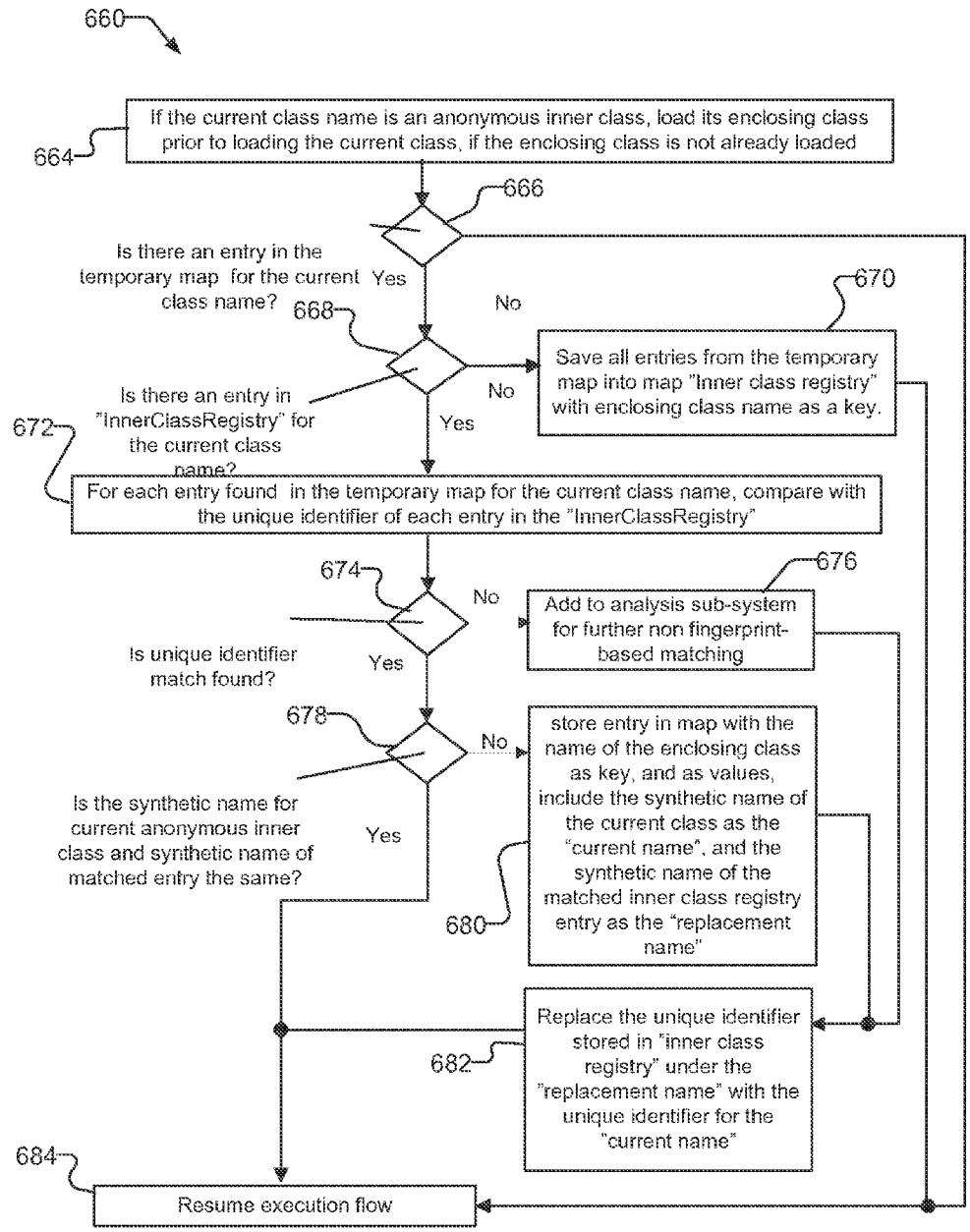

FIG. 5 displays detail for method step 660 in FIG. 3. If the current class name is an anonymous class 150, the method loads its enclosing class 180 prior to loading the current class if the enclosing class 180 is not already loaded, in step 664. Then, in step 666, the method determines if there is an entry in the temporary map for the current class name. If there is no entry in the temporary map for the current class name, such as when the class file is a non-anonymous class, the method transitions to step 684 to resume execution flow. Otherwise, the method transitions to step 668.

In step 668, the method determines if there is an entry in the inner class registry 116 for the current class name. If there are no entries in the inner class registry 116, such as when the inner class registry 116 does not exist after the initial class loading, the method in step 670 saves all entries from the temporary map into the inner class registry 116 with the enclosing class 180 as a key, and transitions to step 684 to resume execution flow. Otherwise, the current class name was found within an entry in the inner class registry 116, which indicates that the current class is a reloaded anonymous class 152. The method transitions to step 672.

In step 672, the method compares the unique identifier 122 of each entry found from the current class name in the temporary map from step 668, with the unique identifier 122 of each entry in the inner class registry 116. In step 674, the method determines if there is a match of the unique identifier 122. If there is no match, the method adds the current name to the analysis subsystem 120 for finding replacement names 172 not solely based on fingerprint-matching criteria, in step 676. Then, the method transitions to step 682. In step 682, the method replaces the unique identifier 122 stored within the inner class registry 116 for the replacement synthetic name 172, with the unique identifier for the current class name.

In step 674, if there is a match between the unique identifier 122 for the current name and the unique identifier 122 for an entry in the inner class registry 116, the method determines in step 678 if the synthetic name for the current anonymous class 150 and the synthetic name of the matched entry are the same. If the names are the same, which indicates that the code of the reloaded anonymous class 152 and the originally loaded anonymous class 150 is the same, the method transitions to step 684 to resume execution flow. If the names are not the same, the method transitions to step 680 to store an entry in the Map 118 with the name of the enclosing class 180 as a key. The entries also include the synthetic name 170 of the current class as a current name, and the synthetic name of the matched entry in the inner class registry 116 as a replacement name.

Upon completion of step 680, the method transitions to step 682 to replace the unique identifier 122 stored within the inner class registry 116 for the replacement synthetic name 172, with the unique identifier 122 for the current class name, and then transitions to step 684 to resume execution flow.

Figure 6:
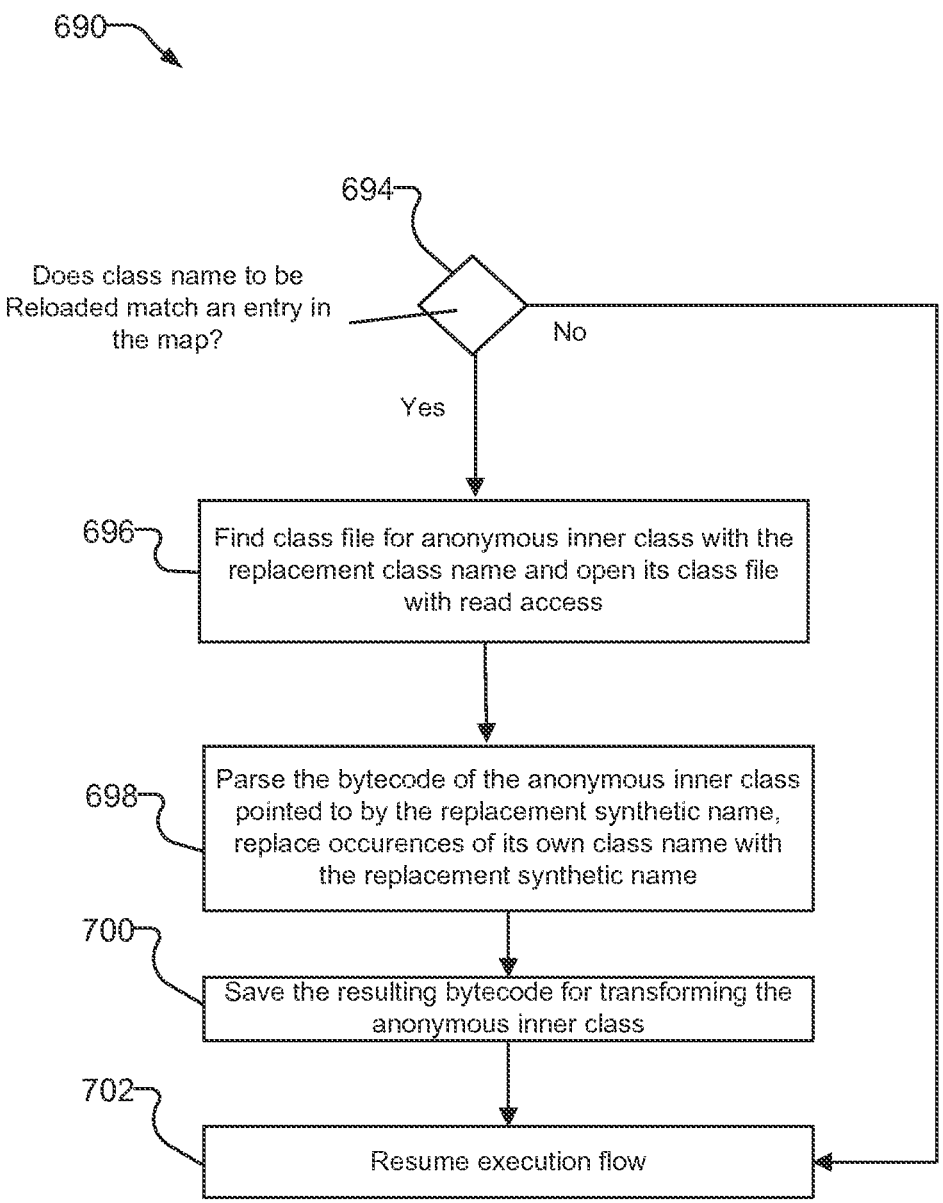

FIG. 6 displays detail for method step 690 in FIG. 3, which is applicable only to loading of reloaded anonymous classes 152 in response to a run-time class reloading event. In step 684, the method determines if the class name to be reloaded matches an entry in the Map 118. If this result is false, the method transitions to step 702 to resume execution flow. Otherwise, the method transitions to step 696, to find the anonymous class file 150 associated with the replacement synthetic name 172 in the matched map entry, and opens the class file with read access.

In step 698, the method parses the bytecode of the anonymous class 150 pointed to by the replacement synthetic name 172, and replaces occurrences of its own class name with the replacement synthetic name 172. Then, in step 700, the method saves/caches the resulting transformed bytecode for transforming the anonymous class, and then transitions to step 702 to resume execution flow.

Figure 7:
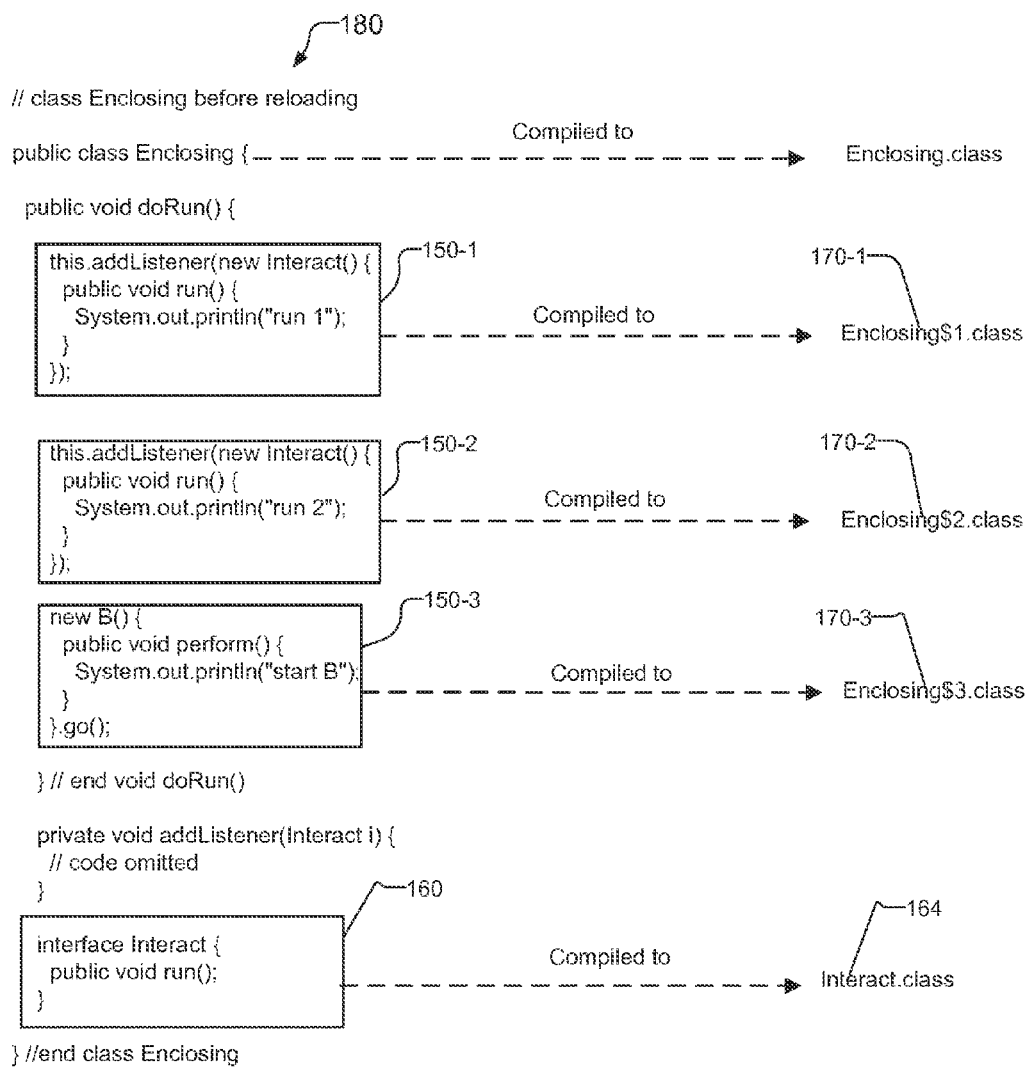
FIG. 7 provides example class files in code for illustrating problems associated with dynamic class updates to anonymous classes, where FIG. 7 provides an example of existing class files of a running application.

FIG. 7 lists Java code for an exemplary enclosing class 180 that includes anonymous classes 150-1 through 150-3 and a local class 160. The code of FIG. 7 is associated with an initial class loading for an application 138.

In FIG. 7, enclosing class "Enclosing" 180 includes three anonymous classes 150-1, 150-2, and 150-3, and local class "Interact" 160. The Java compiler accepts code for the anonymous classes 150, and generates synthetic names "Enclosing$1" 170-1 for anonymous class 150-1, "Enclosing$2" 170-2 for anonymous class 150-2, and "Enclosing$3" 170-3 for anonymous class 150-3. The compiler also creates class file Interact.class 164 in response to compiling local class Interact 160.

FIGS. 8A-8D list Java code for different examples of reloaded anonymous classes 152 included within reloaded enclosing classes 182. Using current systems and methods of run-time class reloading, the reloaded anonymous classes 152 are included in dynamic class updates that change the existing set of anonymous classes 150 of FIG. 7. The description that accompanies the figures details how current class reloading systems and methods experience incorrect run-time behavior after the dynamic updates that include the reloaded anonymous classes 152.

Figure 8A:
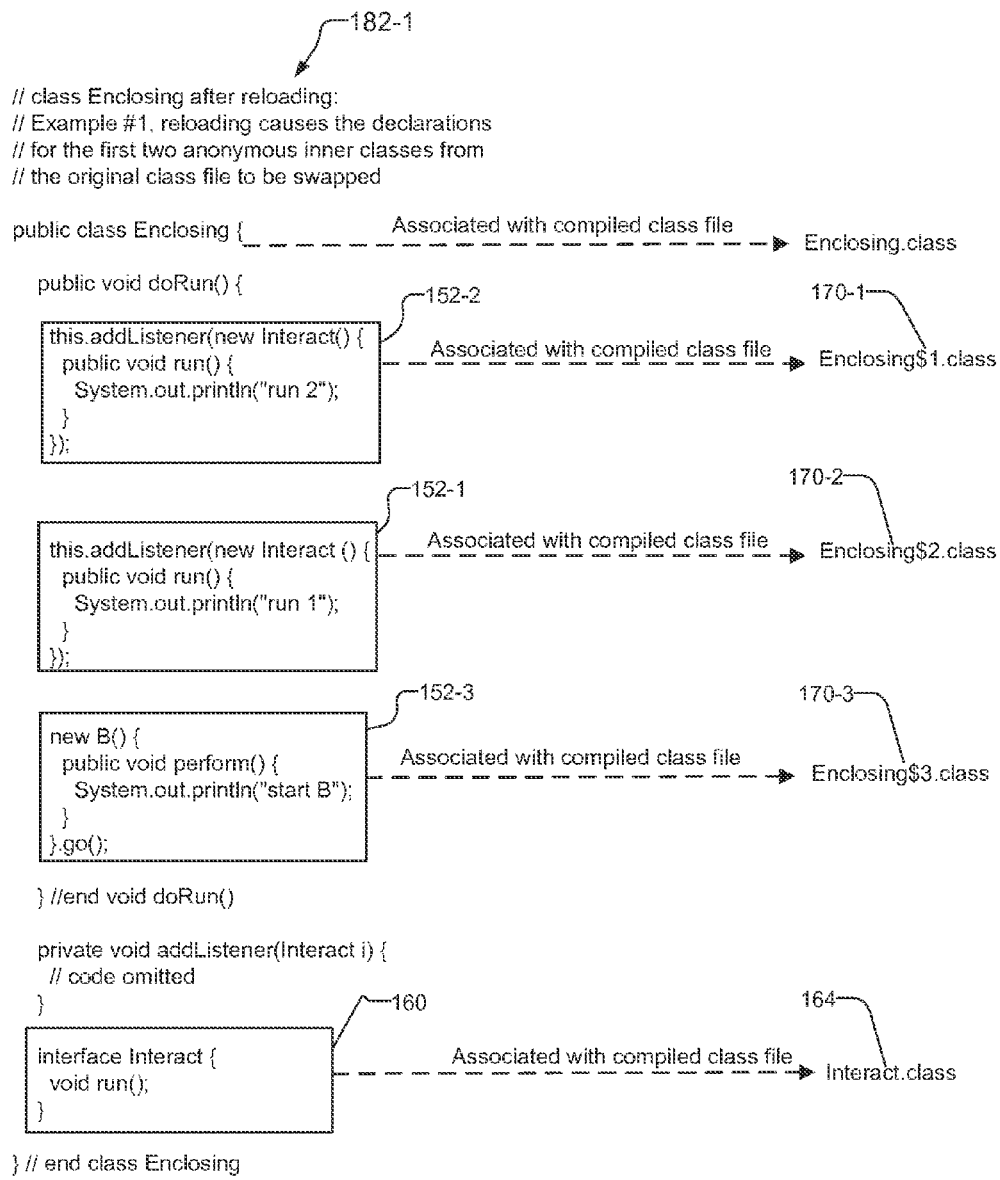

FIG. 8A lists Java code for reloaded enclosing class 182-1 that includes reloaded anonymous classes 152-1 through 152-3. Reloading causes the definitions for the first two reloaded anonymous classes 152-1 and 152-2 to be swapped, compared to the definitions for the same anonymous classes 150-1 and 150-2 of FIG. 7. For example, the code for the first anonymous class 150-1 of FIG. 7 appears as the second reloaded anonymous class 152-1 within enclosing class 182-1 of in FIG. 8A. This is the same scenario as that discussed in the example classes in FIG. 2A.

The synthetically generated names 170-1 and 170-2 for the first two reloaded anonymous classes 152-1 and 152-2, in reloaded enclosing class 182-1, will be swapped as compared to the synthetic names 170-1 and 170-2 generated for the first two anonymous classes 150-1 and 150-2 of original enclosing class 180 in FIG. 7. The Java compiler creates synthetic names "Enclosing$1.class" 170-1 and "Enclosing2.class" 170-2. Incorrect run-time system behavior will result when existing classes in the application 138 attempt to reference objects using the definitions of the reloaded anonymous classes 152-1 and 152-2. This is because the synthetic names 170-1 and 170-2 generated for the reloaded class definitions now point to different anonymous inner classes 152.

Figure 8B:
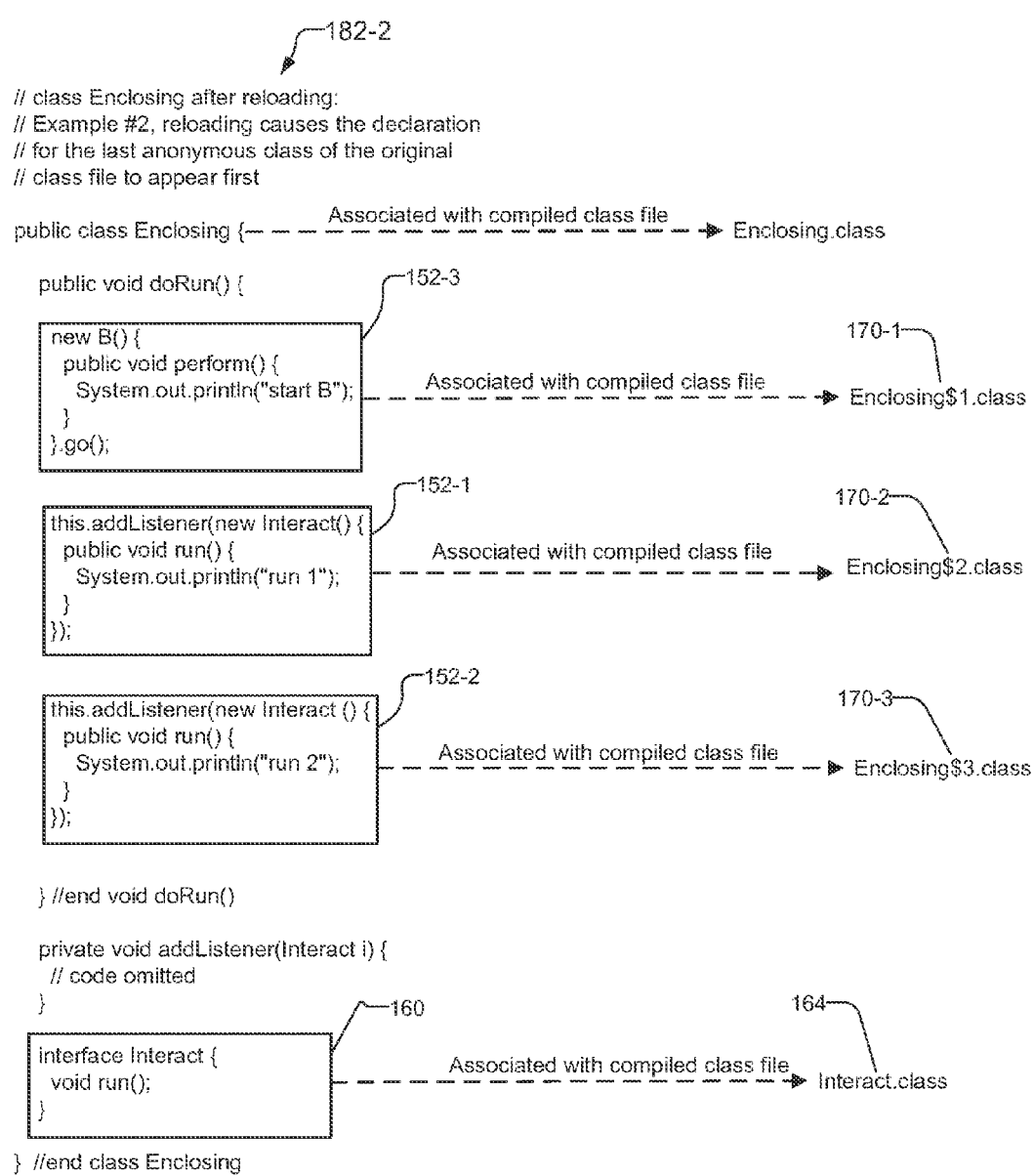

In a similar fashion, FIG. 8B lists Java code for reloaded enclosing class 182-2 which also includes reloaded anonymous classes 152. In this example, however, reloading causes the definition for the last anonymous inner class 150-3 defined in FIG. 7 to appear as the first reloaded anonymous inner class 152-3 of enclosing class 182-2 in FIG. 8B. In response to the dynamic update, the Java compiler creates synthetic name "Enclosing$1.class" 170-1 for reloaded anonymous class 152-3, "Enclosing$2.class" 170-2 for reloaded anonymous inner class 152-1, and "Enclosing$3.class" 170-3 for reloaded anonymous class 152-2. As a result, the run-time behavior of the application 138 will be incorrect when other classes in the application 138 reference objects that use the definitions of the reloaded anonymous classes 152-1 and 152-2.

Figure 8C:
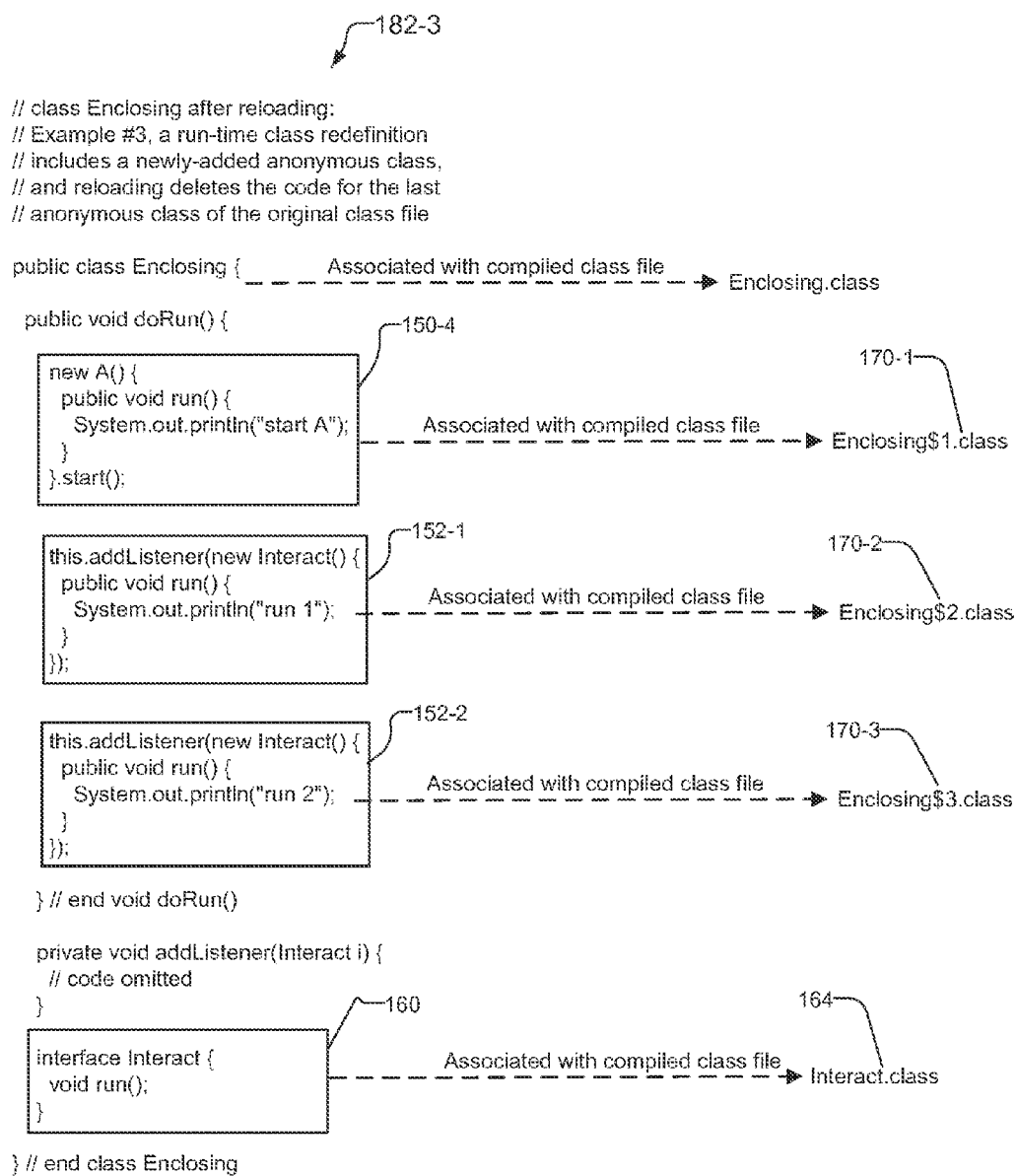

FIG. 8C lists Java code for enclosing class 182-3. In this example, enclosing class 180-3 introduces a new anonymous class 150-4 as the first defined class in enclosing class 180-3, and deletes original/existing anonymous class 150-3 as part of its class redefinition. In response to the dynamic update, the Java compiler generates synthetic names "Enclosing$1.class" 170-1 for anonymous class 150-4, "Enclosing$2.class" 170-2 for reloaded anonymous class 152-1, and "Enclosing$3.class" 170-2 for reloaded anonymous class 152-2.

The FIG. 8C synthetic names 170-1 through 170-3 and the FIG. 7 synthetic names 170-1 through 170-3 do not point to the same code. As a result, incorrect run-time behavior will result when existing classes attempt to access code using the reloaded anonymous inner class definitions pointed to by the FIG. 8C synthetic names 170-1 through 170-3.

FIG. 8D provides yet another example of changes to the originally loaded anonymous classes 150 of FIG. 7 that will cause incorrect run-time behavior after using current systems and methods of run-time class reloading. In FIG. 8D, enclosing class 182-4 includes reloaded anonymous classes 152-3, 152-1, and 152-5. Reloaded anonymous class 152-5 is a modified version of original anonymous inner class 150-2, indicated by code modification 162.

As in the example of FIG. 8B, the Java compiler creates synthetic names "Enclosing$1.class" 170-1 for reloaded anonymous class 152-3, "Enclosing$2.class" 170-2 for reloaded anonymous class 152-1, and "Enclosing$3.class" 170-3 for reloaded anonymous inner class 152-5. However, even if the reloaded anonymous classes 152 of enclosing class 182-4 were defined in the same order as the anonymous classes 150 of original enclosing class 180, run-time behavior may still be incorrect when existing classes reference the code associated with reloaded anonymous inner class 152-5. This is because the FIG. 7 synthetic name 170-3 and the FIG. 8D synthetic name 170-3 would point to different code, which is the code for FIG. 7 anonymous class 150-2, and FIG. 8D reloaded anonymous inner class 152-2, respectively.

FIG. 9A-9D display examples of transformed enclosing classes 184 that the inventive run-time class reloading method creates during a run-time class reloading event. The transformed enclosing classes 184 include transformed anonymous classes 154 that the class interceptor 130 creates for each of the examples in FIGS. 8A-8D. In response to receiving the reloaded anonymous classes 152 in dynamic class updates, the class interceptor 130 loads the reloaded anonymous classes 152 of FIGS. 8A-8D, and transforms the reloaded anonymous classes 152 into the transformed anonymous classes 154 included within the transformed enclosing classes 184.

FIGS. 9A-9D provide a summary of the results when the inventive run-time class reloading method is applied to transform the reloaded anonymous inner classes 152 of examples 8A-8D. For each exemplary reloaded enclosing class 182-1 through 182-4 that includes reloaded anonymous classes 152, FIGS. 9A-9D provide the replacement synthetic names 172 of transformed anonymous classes 154 in transformed enclosing classes 184-1 through 184-4, respectively.

Figure 9A:
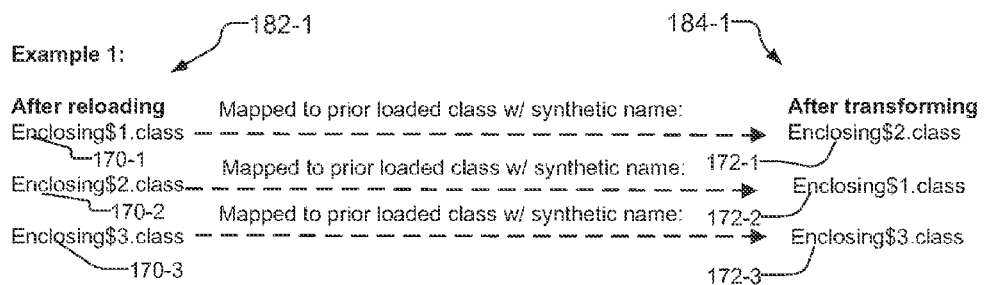
FIGS. 9A-D show how the present invention transforms the reloaded anonymous classes of FIGS. 8A-8D to addresses the improper run-time behavior associated with current run-time class reloading methods.

In FIG. 9A, reloaded enclosing class 182-1 from the example in FIG. 8A is provided as input to method 600. In response, with reference to FIG. 8A for details of the reloaded enclosing class 182-1, synthetic names 170-1 through 170-3 for reloaded anonymous classes 152-2, 152-1, and 152-3, respectfully, are transformed into transformed anonymous classes 154 within transformed enclosing class 184-1 by class interceptor 130 via method 600.

Specifically, using method 600 associated with the preferred embodiment, the class transformer 130 applies replacement synthetic name "Enclosing$2.class" 172-1 as the synthetic name associated with the first transformed anonymous class 154 within transformed enclosing class 184-1. The replacement synthetic name "Enclosing$2.class" 172-1 and synthetic name "Enclosing$2.class" 170-2 point to the same originally loaded anonymous class 150-2. In a similar fashion, the class transformer 130 applies replacement synthetic name "Enclosing$1.class" 172-2 as the synthetic name associated with the second transformed anonymous class 154 within transformed enclosing class 184-1, and applies replacement synthetic name "Enclosing$3.class" 172-3 as the synthetic name associated with the third transformed anonymous class 154 within transformed enclosing class 184-1.

Figure 9B:
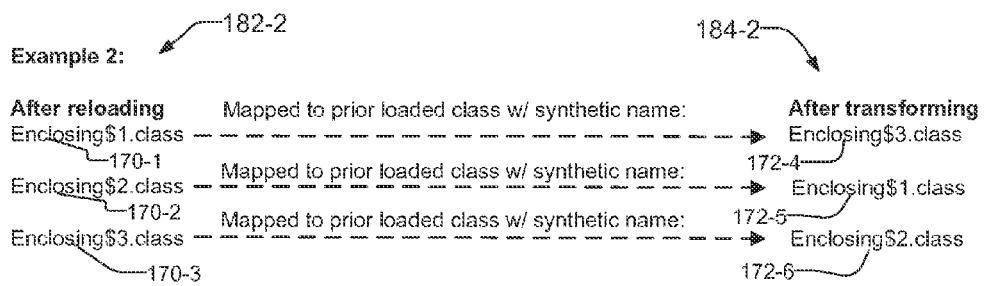

In FIG. 9B, reloaded enclosing class 182-2 from the example in FIG. 8B is provided as input to method 600. In response, with reference to FIG. 8B for details of the reloaded enclosing class 182-2, synthetic names 170-1 through 170-3 for reloaded anonymous inner classes 152-3, 152-1, and 152-2, respectfully, are transformed into transformed anonymous classes 154 within transformed enclosing class 184-2.

Specifically, using method 600 associated with the preferred embodiment, the class transformer 130 applies replacement synthetic name "Enclosing$3.class" 172-4 as the synthetic name associated with the first transformed anonymous inner class 154 within transformed enclosing class 184-2. The replacement synthetic name "Enclosing$3.class" 172-4 and synthetic name "Enclosing$3.class" 170-3 point to the same originally loaded anonymous class 150-3. In a similar fashion, the class transformer 130 applies replacement synthetic name "Enclosing$1.class" 172-5 as the synthetic name associated with the second transformed anonymous inner class 154 within transformed enclosing class 184-2, and applies replacement synthetic name "Enclosing$2.class" 172-6 as the synthetic name associated with the third transformed anonymous class 154 within transformed enclosing class 184-2.

Figure 9C:
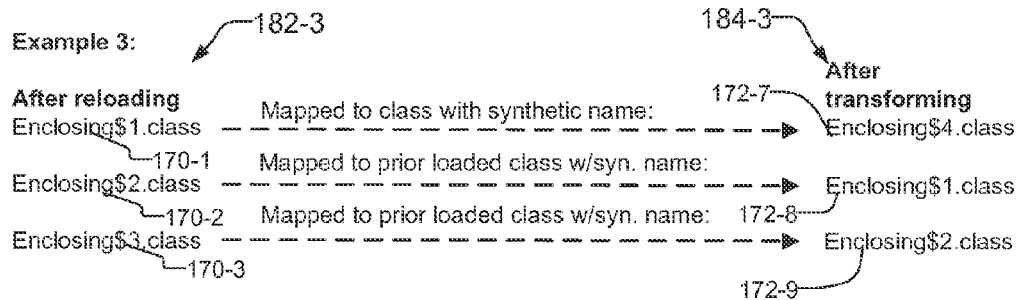

In FIG. 9C, reloaded enclosing class 182-3 from the example in FIG. 8C is provided as input to method 600. In response, with reference to FIG. 8C for details of the reloaded enclosing class 182-3, synthetic name 170-1 for newly added anonymous class 150-4, synthetic name 170-2 for reloaded anonymous inner class 152-1, and synthetic name 170-3 for reloaded anonymous class 152-2 are transformed into transformed anonymous inner classes 154 within transformed enclosing class 184-3.

Specifically, using method 600 associated with the preferred embodiment, the class transformer 130 applies replacement synthetic name "Enclosing$4.class" 172-7 as the synthetic name associated with the first transformed anonymous class 154 within transformed enclosing class 184-3. Method 600 initially determines that synthetic name "Enclosing$1.class" 170-1 of reloaded enclosing class 182-3 has the same synthetic name 170 as a previously loaded anonymous inner class 150, according to FIG. 5 step 672.

However, according to FIG. 5 step 674, the fingerprint/unique identifier 122 for the first transformed anonymous class 154, which is the code for newly added anonymous inner class 150-4, does not match the unique identifier 122 associated with any previously loaded anonymous classes 150. As a result, method 600 traverses the path associated with FIG. 5 step 676, and utilizes the analysis subsystem 120 to further examine such additional information as the super names of the current class to identify the code of the current class.

Using the super names of the current class, method 600 determines that the code for the current class is for newly added class 150-4. In response, method 600, in step 682, creates a unique replacement synthetic name 172-7 "Enclosing$4.class" associated with newly added class 150-4, for the first transformed anonymous inner class 154 in transformed enclosing class 184-3.

The class transformer 130 applies replacement synthetic name "Enclosing$1.class" 172-8 as the synthetic name associated with the second transformed anonymous class 154 within transformed enclosing class 184-3, and applies replacement synthetic name "Enclosing$2.class" 172-9 as the synthetic name associated with the third transformed anonymous inner class 154 within transformed enclosing class 184-3.

Figure 9D:
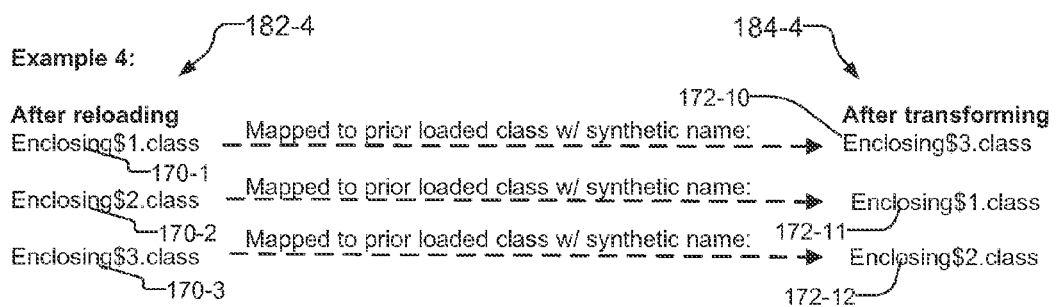

In FIG. 9D, reloaded enclosing class 182-4 from the example in FIG. 8D is provided as input to method 600. In response, with reference to FIG. 8D for details of the reloaded enclosing class 182-4, synthetic name 170-1 for reloaded anonymous class 152-3, synthetic name 170-2 for reloaded anonymous class 152-1, and synthetic name 170-3 for a redefined version of anonymous inner class 152-2, labeled as 152-5, are transformed into transformed anonymous classes 154 within transformed enclosing class 184-4 by class interceptor 130 via method 600.

Specifically, using method 600 associated with the preferred embodiment, the class transformer 130 applies replacement synthetic name "Enclosing$3.class" 172-10 as the synthetic name associated with the first transformed anonymous inner class 154 within transformed enclosing class 184-4, and applies replacement synthetic name "Enclosing$1.class" 172-11 as the synthetic name associated with the second transformed anonymous class 154 within transformed enclosing class 184-4.

For the third transformed anonymous inner class 154, method 600 initially determines that synthetic name "Enclosing$3.class" 170-3 of reloaded enclosing class 182-4 has the same synthetic name 170 as a previously loaded anonymous class 150, according to FIG. 5 step 672.

However, according to FIG. 5 step 674, the fingerprint/unique identifier 122 for the third transformed anonymous inner class 154, which is the code for redefined anonymous class 152-5, does not match the unique identifier 122 associated with any previously loaded anonymous inner classes 150. This is because the fingerprint/unique identifiers 122 associated with original anonymous class 150-2 and redefined anonymous inner class 152-5 are different, due to code modification 162.

As a result, method 600 traverses the path associated with FIG. 5 step 676, and utilizes the analysis subsystem 120 to further examine such additional information as the super names of the current class to identify the code of the current class. In response, in one implementation, the analysis subsystem 120 in FIG. 5 step 676 determines that redefined anonymous class 152-5 and original anonymous inner class 150-2 fulfills the criteria for a match. This is primarily because the super class is the same for the classes. Hence, the class transformer 130 applies replacement synthetic name "Enclosing$2.class" 172-12 as the synthetic name associated with the third transformed anonymous class 154 within transformed enclosing class 184-4.

It is important to stress that the computations provided by the analysis subsystem 120 can be fairly simple, like the calculations for the examples of FIGS. 9C and 9D. However, the calculations can also be extremely complex, where such criteria like the numeric distance between unmatched classes to their former versions may need to be taken into account before making any decisions about possible mappings. The implementation of the analysis subsystem 120 will evolve with actual run-time experience and will accordingly be fine-tuned in response.

Figure 10:
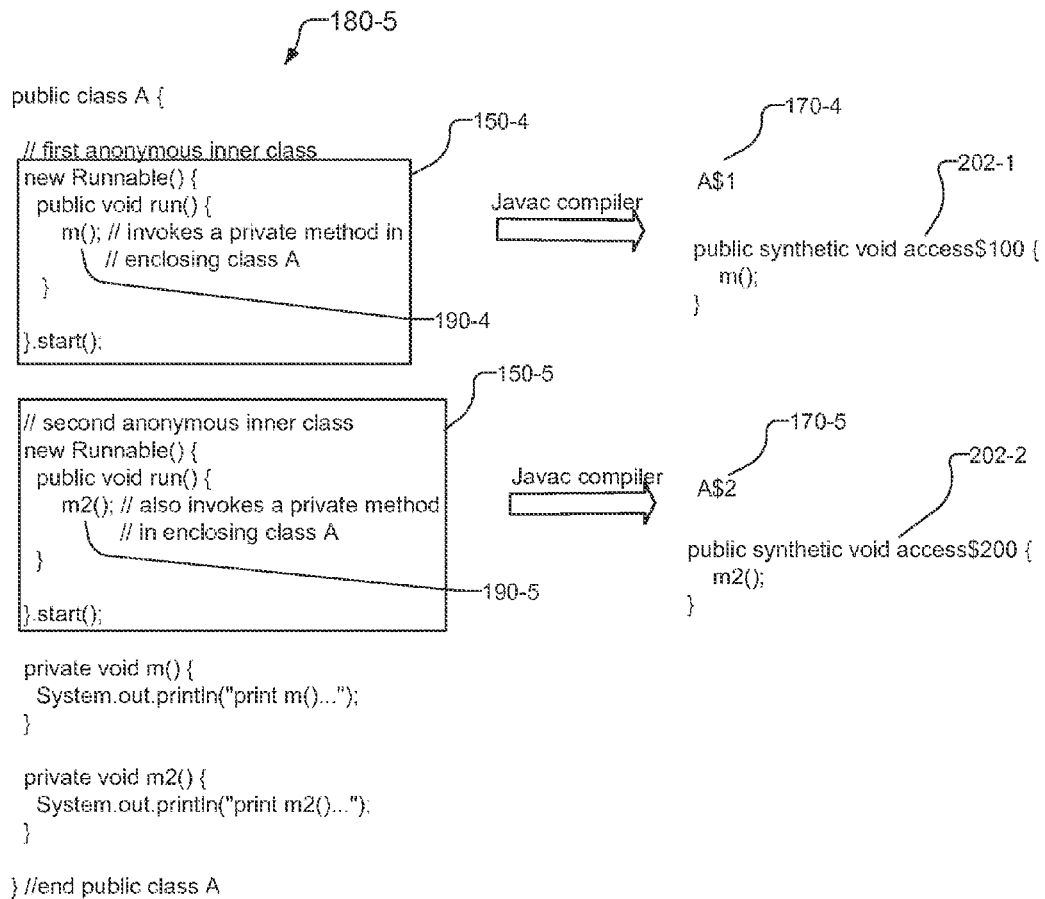
FIG. 10 provides an example of class files in code for which a compiler creates synthetic methods known as bridge methods, for illustrating the applicability of the present invention to reloaded versions of anonymous classes that reference bridge methods.

FIG. 10 provides an example of anonymous inner classes 150-4 and 150-5 that attempt to access private data members of its enclosing class "A" 180-5. In order to comply with the access restrictions of the JVM, which requires that only methods of a class can access the class' private members, the Java compiler creates bridge methods 202-1 and 202-2. The bridge methods 202 allow the anonymous classes to access private methods m( ) 190-4 and m2( ) 190-5 from the anonymous inner classes 150. Essentially, the Java compiler replaces invocations to private methods in the anonymous classes with invocations to public bridge methods 202.

However, there is a problem with this approach when developers redefine the contents of the anonymous inner classes 150 in dynamic class updates using current class reloading methods. When the class interceptor 130 calculates a fingerprint as the unique identifier 172 for the anonymous classes, it utilizes bytecode instructions which, in this case, will contain access$100 202-1 for the synthetic name A$1.class 170-4, and access$200 202-2 for the synthetic name A$2.class 170-5.

For the example, consider that the refactoring of the enclosing class 180-5 by the developer simply swaps the placement of m( ) 190-4 and m2( ) 190-5. This reordering has the consequence that the unique identifier 122 associated with the bytecode of the reloaded A$1 class 170-4 will match exactly with that of the A$2 class 170-5. As a result, current class reloading systems will remap those classes so that any existing client having a reference to an instance of the A$1 class, will invoke method m2( ) 190-5 after reloading, which is incorrect.

One implementation resolves the false positive identifier match for the anonymous inner classes 150 in the aforementioned example by additionally calculating fingerprints for bridge methods 202. As with the generation of fingerprints or unique identifiers 122 associated with anonymous classes 150, the method generates fingerprints for bridge methods 202 associated with bytecode of their method bodies.

The method calculates the fingerprint or unique identifier 122 of the bridge method 202 during the parsing of each anonymous inner class 150 in step 632. Specifically, method 600 performs the calculation when the parser 112 encounters the bytecode of the instruction within the current class being parsed that invokes the bridge method 202. Method 600 then utilizes the fingerprint or unique identifier 122 of the bridge method 202 instead of the unique identifier 122 of the anonymous class 150.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for transforming name synthesized classes of existing classes of an application running on a computer system, in response to dynamic class updates to the existing classes, the method comprising:
   in response to a run-time event that reloads the name synthesized classes of the existing classes with reloaded name synthesized classes, comparing unique identifiers created for each of the reloaded name synthesized classes with entries in a data structure that include unique identifiers created for previously loaded name synthesized classes, wherein the entries in the data structure include a synthetic name and a replacement synthetic name for each of the reloaded name synthesized classes corresponding to the unique identifiers created for the reloaded name synthesized classes; and
   in response to finding that a unique identifier for a reloaded name synthesized class matches a unique identifier of an entry in the data structure, replacing occurrences of the synthetic name within bytecode of the reloaded name synthesized class with a corresponding replacement synthetic name in the data structure.

2. The method of claim 1, wherein intercepting loading of the classes during each dynamic class update enables creation of the data structure utilized for transforming the name synthesized classes.

3. The method of claim 1, further comprising indexing the data structure entries by the names of enclosing classes for each of the name synthesized classes.

4. The method of claim 1, wherein each replacement synthetic name is associated with a version of the name synthesized classes that was loaded during a prior dynamic class update or original class loading to the existing classes.

5. The method of claim 1, further comprising storing metadata associated with each of the name synthesized classes loaded during the dynamic class updates to identify different versions for the name synthesized classes.

6. The method of claim 1, further comprising storing super class names, field names, method names, constructors, nested inner classes, and names of implemented interfaces for each of the name synthesized classes loaded during the dynamic class updates.

7. The method of claim 1, further comprising storing unique identifiers associated with each of the name synthesized classes loaded during the dynamic class updates to identify bytecode of the name synthesized classes.

8. The method of claim 7, further comprising calculating the unique identifiers for each of the name synthesized classes by creating a fingerprint based on the bytecode for each of the name synthesized classes.

9. The method of claim 7, further comprising determining each replacement synthetic name by:
    comparing the unique identifiers for each of the reloaded name synthesized classes during the run-time reloading event with the unique identifiers for the name synthesized classes previously loaded; and
    using the synthetic name of the name synthesized class of a matched unique identifier, from the name synthesized classes previously loaded, as the replacement synthetic name.

10. The method of claim 7, further comprising updating values of the unique identifiers for each of the reloaded name synthesized classes during the run-time event that reloads the name synthesized classes, in response to identifying bridge methods generated by a compiler in each enclosing class of the reloaded name synthesized classes.

11. The method of claim 1, further comprising ensuring that enclosing classes for each of the name synthesized classes are loaded prior to loading the name synthesized classes.

12. The method of claim 1, further comprising transforming lambda expressions implemented by a source compiler as the name synthesized classes.

13. The method of claim 1, further comprising accepting redefined name synthesized classes during the dynamic class updates to the existing classes.

14. The method of claim 1, further comprising accepting redefined enclosing classes of the name synthesized classes during the dynamic class updates to the existing classes.

15. The method of claim 1, wherein the transforming of the reloaded name synthesized classes enables the existing classes to invoke originally loaded versions of the name synthesized classes.

16. The method of claim 1, further comprising leaving bytecode unchanged for classes other than the name synthesized classes during the dynamic class updates to existing classes.

17. The method of claim 1, further comprising executing the method within a virtual machine, the virtual machine running on the computer system.

18. The method of claim 1, wherein the name synthesized classes are associated with anonymous classes.

19. A method for transforming synthetically generated code of classes in response to dynamic class updates to classes of an application running on a computer system, the method comprising:
    in response to a run-time event that reloads the classes, comparing synthetic names for each of the reloaded classes with entries in a data structure that includes synthetic names created for previously loaded classes, wherein the entries in the data structure include a synthetic name and a replacement synthetic name for each of the reloaded name synthesized classes corresponding to the synthetic name for the reloaded classes; and
    in response to finding that the synthetic names for each reloaded class matches a synthetic name of an entry in the data structure, replacing occurrences of the synthetic name within the generated code in each reloaded class with a corresponding replacement synthetic name in the data structure.

20. The method of claim 19, wherein the synthetically generated code is associated with anonymous classes.

21. The method of claim 19, wherein the synthetically generated code is associated with bridge methods.

22. The method of claim 19, wherein the synthetically generated code is associated with lambda expressions.

23. The method of claim 19, further comprising replacing the occurrences of the synthetic name in each reloaded class with the replacement synthetic name from the matched data structure entry to transform the classes.

24. A system including at least one processor for transforming name synthesized classes of existing classes of an application running on a computer system, in response to dynamic class updates to the existing classes, the system comprising:
    a class interceptor executing on the computer system that intercepts loading of dynamically updated class definitions of the existing classes by a class loader, the dynamically updated class definitions of the existing classes including reloaded name synthesized classes, and wherein the class interceptor:
    in response to a run-time event that causes the class loader to reload the name synthesized classes, compares unique identifiers for each of the reloaded name synthesized classes with entries in a data structure that include unique identifiers for the existing name synthesized classes, wherein the entries in the data structure include a synthetic name and a replacement synthetic name for each of the reloaded name synthesized classes corresponding to the unique identifiers created for the reloaded name synthesized classes; and
    in response to finding that a unique identifier for a reloaded name synthesized class matches a unique identifier of an entry in the data structure, replaces occurrences of synthetic names within bytecode of the reloaded name synthesized class with a corresponding replacement synthetic name in the data structure.

* * * * *